(12) United States Patent
Unno et al.

(10) Patent No.: US 9,213,198 B2
(45) Date of Patent: Dec. 15, 2015

(54) DISPLAY APPARATUS, AUTOMOTIVE DISPLAY APPARATUS, AND METHOD FOR MANUFACTURING THE DISPLAY APPARATUS

(71) Applicant: NISSAN MOTOR CO., LTD., Yokohama-shi, Kanagawa (JP)

(72) Inventors: Haruo Unno, Atsugi (JP); Isao Yamamoto, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/378,245

(22) PCT Filed: Feb. 8, 2013

(86) PCT No.: PCT/JP2013/052989
§ 371 (c)(1),
(2) Date: Aug. 12, 2014

(87) PCT Pub. No.: WO2013/121991
PCT Pub. Date: Aug. 22, 2013

(65) Prior Publication Data
US 2015/0009429 A1    Jan. 8, 2015

(30) Foreign Application Priority Data

Feb. 14, 2012   (JP) ................. 2012-029267

(51) Int. Cl.
*C09K 19/00* (2006.01)
*G02F 1/1335* (2006.01)
(Continued)

(52) U.S. Cl.
CPC ............ *G02F 1/133528* (2013.01); *G02B 5/30* (2013.01); *G02F 1/1333* (2013.01); *G02F 1/1335* (2013.01); *G02F 1/13338* (2013.01); *G02F 1/13363* (2013.01); *G06F 3/041* (2013.01); *G09F 9/00* (2013.01); *G02F 2001/0139* (2013.01); *G02F 2001/133638* (2013.01); *G02F 2203/06* (2013.01); *Y10T 428/1036* (2015.01)

(58) Field of Classification Search
CPC ..... G06F 3/041; G06F 3/0412; G06F 3/0416; G02B 5/3033; G02B 27/28; G02B 27/285; G02F 1/13338; G02F 2202/28; G02F 2001/133638; H01L 51/5262; Y10T 428/10; Y10T 428/1036; Y10T 428/105; B32B 2457/202
USPC ............... 428/1.1, 1.3, 1.33; 349/12, 96, 112, 349/187; 359/488.01, 494.01
See application file for complete search history.

(56) References Cited

U.S. PATENT DOCUMENTS

2005/0274596 A1* 12/2005 Nashiki et al. ................ 200/512
2009/0180068 A1    7/2009 Kikuchi et al.

FOREIGN PATENT DOCUMENTS

| JP | 2008-208231 A | 9/2008 |
| JP | 2008-310309 A | 12/2008 |
| JP | 2008-310310 A | 12/2008 |
| JP | 2010-91655 A | 4/2010 |

(Continued)

*Primary Examiner* — Ruiyun Zhang
(74) *Attorney, Agent, or Firm* — Foley & Lardner LLP

(57) ABSTRACT

A display apparatus includes: a liquid crystal panel (31); a touch panel (31) placed on the liquid crystal panel (31); a base material layer (37, 40) stacked on the touch panel (34); and an adhesive layer (36, 39) interposed between the touch panel (34) and the base material layer (37, 40). Fiber having properties to solve polarization is contained in at least one of the base material layer (37, 40) and the adhesive layer (36, 39).

15 Claims, 4 Drawing Sheets

(51) Int. Cl.
*G02F 1/1333* (2006.01)
*G02B 5/30* (2006.01)
*G06F 3/041* (2006.01)
*G09F 9/00* (2006.01)
*G02F 1/13363* (2006.01)
*G02F 1/01* (2006.01)

(56) References Cited

FOREIGN PATENT DOCUMENTS

| | | |
|---|---|---|
| JP | 2010-132768 A | 6/2010 |
| WO | WO 2007/055269 A1 | 5/2007 |

* cited by examiner (a)　　　(b)　　　(c)

(d)　　　(e)　　　(f)

DISPLAY APPARATUS, AUTOMOTIVE DISPLAY APPARATUS, AND METHOD FOR MANUFACTURING THE DISPLAY APPARATUS

TECHNICAL FIELD

The present invention relates to a display apparatus including a liquid crystal panel, to an automotive display apparatus, and to a method for manufacturing the display apparatus.

BACKGROUND ART

A liquid crystal panel has a configuration, in which liquid crystal is filled into a gap between two glass plates, and a polarization plate is arranged on an outside of one of the glass plates, and accordingly, a displayed image displayed on the liquid crystal panel is linearly polarized in terms of principle. In a case where the displayed image, which is linearly polarized, is observed through sunglasses having a polarization function, and a polarization direction of the sunglasses and a polarization direction of the displayed image forms a relationship of the crossed Nicols, then a quantity of light transmitting through the sunglasses is lowered to a large extent, and visibility of the displayed image is significantly lowered.

As a technology for solving such polarization of the displayed image, a polarization solving plate, which uses porous particles made of polyamide, is proposed (refer to Patent Literature 1).

CITATION LIST

Patent Literature

Patent Literature 1: Japanese Unexamined Patent Application Publication No. 2010-132768

SUMMARY OF INVENTION

However, a size of the porous particles described in Patent Literature 1 is a few micrometers in diameter at minimum, and a haze (opacity) of the polarization solving plate is increased by the fact that the porous particles become a diffusion source of incident visible light, whereby the polarization solving plate becomes unsuitable for a display apparatus for which high transparency is required.

The present invention has been made in consideration of the above-described problem. It is an object of the present invention to provide a display apparatus capable of enhancing the visibility of the displayed image by enhancing polarization solving properties for the displayed image, to provide an automotive display apparatus, and to provide a method for manufacturing the display apparatus.

A display apparatus according to an aspect of the present invention includes: a liquid crystal panel; a touch panel placed on the liquid crystal panel; a base material layer stacked on the touch panel; and an adhesive layer interposed between the touch panel and the base material layer. Fiber having properties to solve polarization is contained in at least one of the base material layer and the adhesive layer.

DESCRIPTION OF EMBODIMENTS

Figure 1:
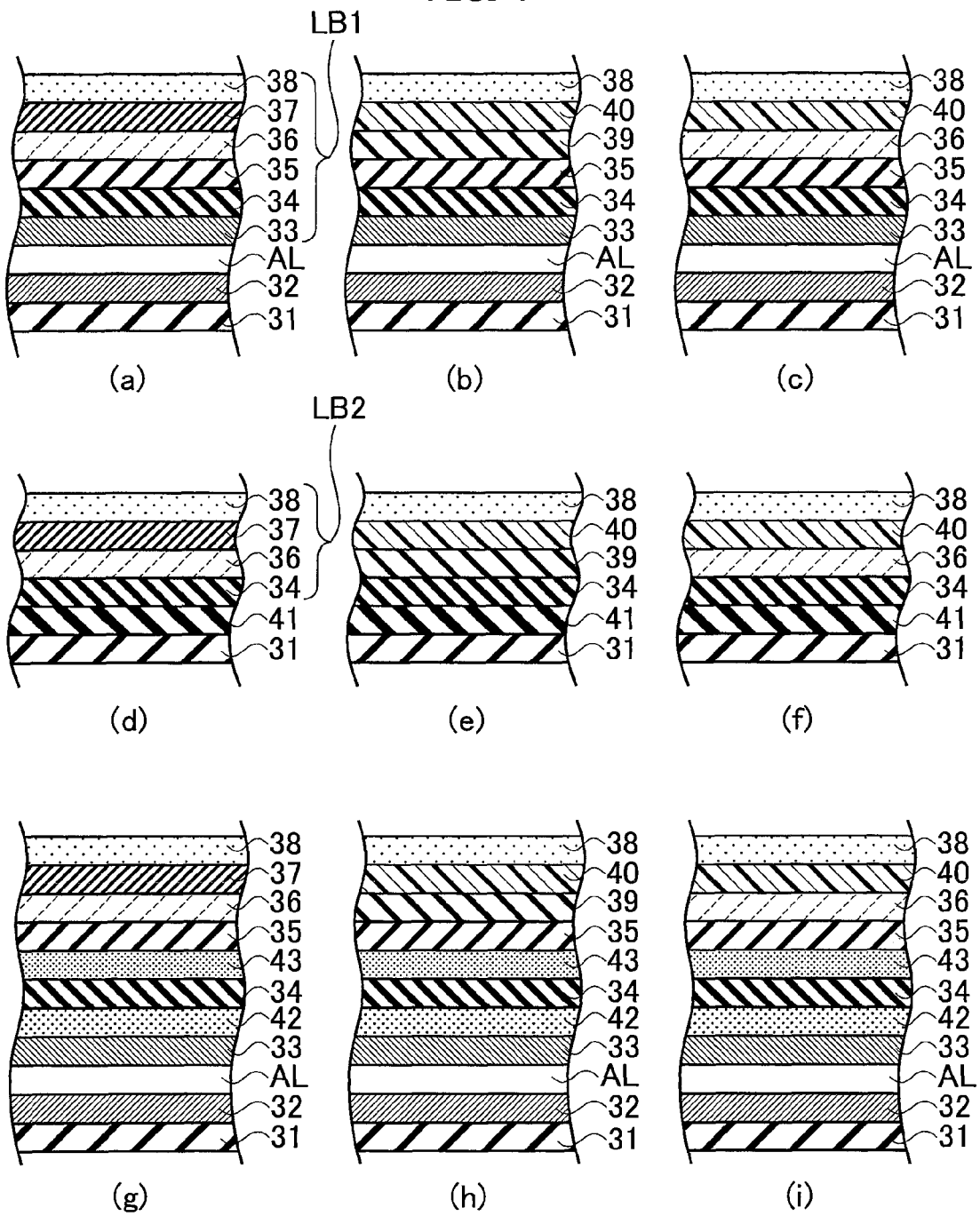
FIG. 1A to FIG. 1I are cross-sectional views showing stack structures of display apparatuses according to Example 1 to Example 9.

A description is made below of an embodiment of the present invention with reference to the drawings. In a description of the drawings, the same reference numerals are assigned to the same portions.

For example, as shown in FIG. 1A, a display apparatus according to the embodiment at least includes: a liquid crystal panel (LCD) 31; a touch panel (electrostatic capacitance T/P) 34 placed above the liquid crystal panel 31; a base material layer (surface base material) 37 stacked on the touch panel 34; and an adhesive layer (polarization solving adhesive) 36 interposed between the touch panel 34 and the base material layer 37. Then, at least one of the base material layer 37 and the adhesive layer 36 contains fiber having properties to solve polarization (i.e., depolarization properties).

For example, the liquid crystal panel 31 is a general transmission-type liquid crystal panel that performs display by partially cutting off and transmitting light emitted from a light source such as a backlight and a front light. An outline of a stack structure of the liquid crystal panel will be described later with reference to FIG. 3.

Figure 2:
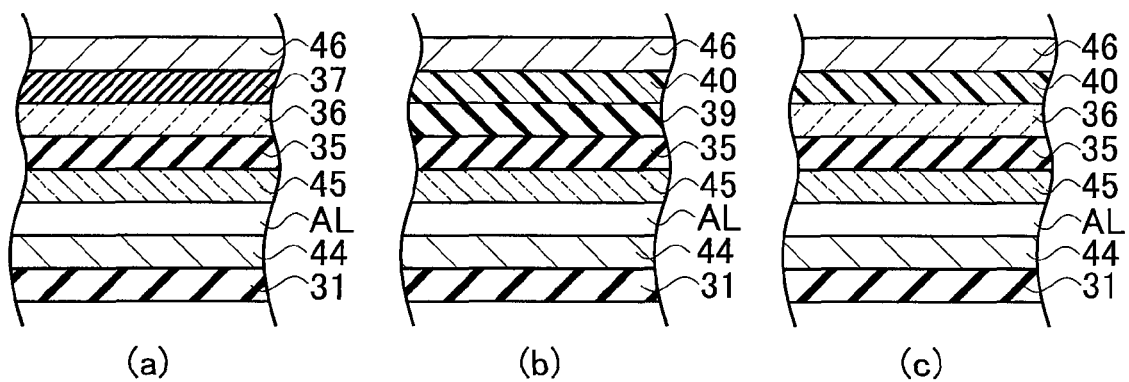
FIG. 2A to FIG. 2F are cross-sectional views showing stack structures of display apparatuses according to Example 10 to Example 15.
Figure 2:
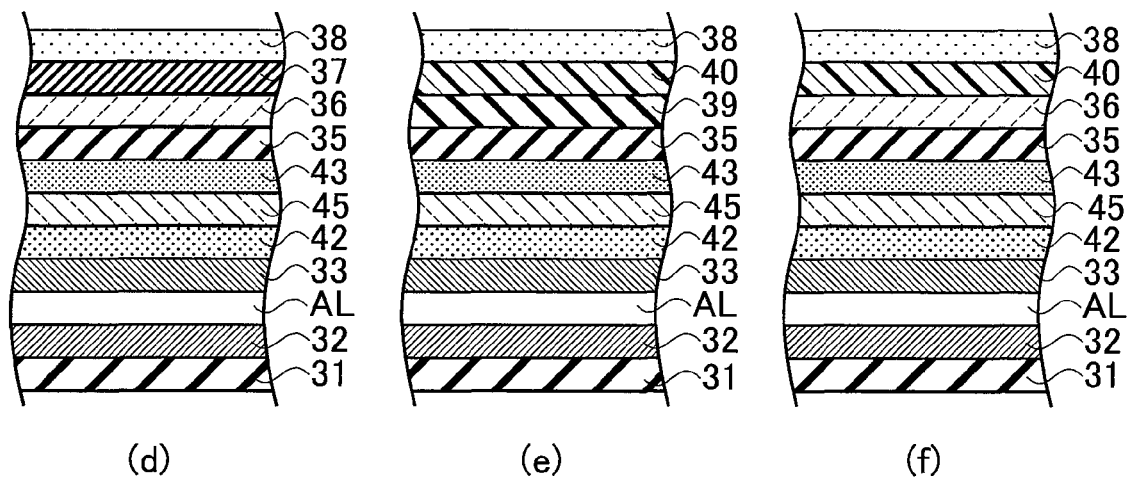

The touch panel 34 is a position detection device, which senses information about a screen position touched by an operator, the screen position belonging to a display screen of the liquid crystal panel 31, and outputs the sensed information as an information signal to an outside, and is placed on an output side of a displayed image displayed by the liquid crystal panel 31. As a placement example of the touch panel 34, the example is included that between the touch panel 34 and the liquid crystal panel 31, a gas layer AL, which has a uniform thickness and is filled with inert gas such as air and rare gas, is interposed. In this case, at least one of between the touch panel 34 and the gas layer AL and between the liquid crystal panel 31 and the gas layer AL, an anti-reflection film (AR film) 32 or 33 may be interposed, or alternatively, an anti-glare film (AG film) 44 may be interposed as shown in FIG. 2A. In such a way, a reflection on an interface with the gas layer AL and a glare to the liquid crystal panel 31 can be suppressed.

As another example of placing the touch panel 34, as shown in each of FIG. 1D to FIG. 1F, the example is included that a bonding agent 41 is interposed between the touch panel 34 and the liquid crystal panel 31. In this case, the touch panel 34 is directly stacked on the liquid crystal panel 31 while interposing the bonding agent 41 therebetween, and the gas layer AL is not interposed between the touch panel 34 and the liquid crystal panel 31.

As shown in FIG. 1A and FIG. 2A, as the touch panel, for example, such an electrostatic capacitance-type touch panel 34 or a resistance film-type touch panel (resistance film T/P) 45 can be used. However, the touch panel is not limited to the touch panels according to these operation principles, and touch panels according to other operation principles may be used.

Figure 3:
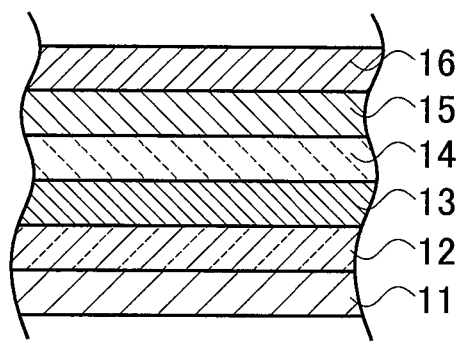
FIG. 3 is a cross-sectional view showing an outline of a stack structure of a liquid crystal panel 31.

In usual, the liquid crystal panel 31 has a linear polarization plate located more on the output side than the liquid crystal layer, and accordingly, the displayed image outputted from the liquid crystal panel 31 is linearly polarized. Specifically, as shown in FIG. 3, the liquid crystal layer 14 is sandwiched by a front surface electrode 15 and a back surface electrode 13, and a linear polarization plate (horizontal polarization plate) 12 and a linear polarization plate (vertical polarization plate) 16 are arranged on front and back surfaces thereof, respectively. A light source 11 is arranged on the back surface of the linear polarization plate 12. Hence, the displayed image of the liquid crystal panel 31 is formed of light, which has transmitted through the linear polarization plate 16 arranged more on the output side than the liquid crystal layer 14, that is, linearly polarized light.

Returning to FIG. 1A, in a case of using the touch panel 34, sometimes, a face and clothes reflect on the display screen owing to internal reflection and back surface reflection thereof, and the touch panel 34 is felt glaring in a case where intense light such as sunlight is incident thereonto. In order to reduce such reflection on the screen and glaring thereof, in some case, a linear polarization layer 35 is provided on an output side of the touch panel 34. In this case, the displayed image outputted from the touch panel 34 will be linearly polarized. As described above, the displayed image made of the light transmitting through the liquid crystal panel 31 and the touch panel 34 is linearly polarized.

The linear polarization layer 35 has a function to transmit only light, which vibrates in a certain specific direction, among pieces of light, which vibrate in every direction. The light outputted from the liquid crystal panel 31 is linearly polarized. Therefore, the linear polarization layer 35 arranged on the touch panel 34 is arranged in an orientation of transmitting the polarization from the liquid crystal panel 31 side, whereby a part of a light component incident from the light side can be cut off without lowering brightness of the displayed image displayed on the liquid crystal panel 31. As described above, the linear polarization layer 35 is one to be used according to needs in order to further improve the visibility, and in usual, is composed of a linear polarization film. A thickness of this linear polarization film is 25 to 200 μm.

As an example, the adhesive layer 36 is made of a polarization solving adhesive containing fiber (hereinafter, referred to as "polarization solving fiber") having properties to solve the polarization. A parent material of the polarization solving adhesive is a transparent adhesive agent including acrylic-based, epoxy-based, phenol-based, emulsion-based and silicon-based adhesives. In such a way, an adhesive composition excellent in transparency and durability can be obtained.

The polarization solving fiber is an aggregate of cellulose nano-fiber. The cellulose nano-fiber contains a hydroxyl group, and a part of the hydroxyl group is chemically modified. A width of the polarization solving fiber is 10 nm or more to 50 nm or less, and an aspect ratio of the polarization solving fiber is 1 or more to 200 or less.

Such chemical modification of the cellulose fiber is not particularly limited as long as the cellulose fiber is dispersed into the parent material (transparent adhesive or transparent resin) to an extent to which transparency required as a transparent optical film is obtained. As a group for chemical modification, for example, a hydrophobic functional group is preferable. And the cellulose fibers are preferable, in which an alkyl group, and particularly, an acetyl group, a phenyl group, an epoxy group, a maleate functional group and a carboxyl group are substituted for the hydroxyl group on a surface of the cellulose fiber.

Note that the chemical modification can be confirmed by FT-IR analysis. For example, in a case where the cellulose nano-fiber is chemically modified by the acetyl group, then the acetyl group has a chemical structure of $CH_3CO$, and absorption (stretching vibrations) of a $C=O$ double bond is at $1650\ cm^{-1}$, and accordingly, in a case where a peak develops at this frequency as a result of the FT-IR analysis, then it can be confirmed that the cellulose nano-fiber is modified by the acetyl group. In this case, the cellulose fiber before such acetyl formation includes many hydroxyl groups (—OH groups), but does not include the acetyl group, and accordingly, a difference therebetween is obvious.

Moreover, it is also preferable to mix the cellulose nano-fiber with an organic acid as a dispersant. In particular, it is a preferable form, in which the cellulose nano-fiber is mixed with a dispersant including sulfonic acid, a phosphoric acid and carboxylic acid, whereby the dispersant is unevenly distributed on an interface between the surface of the cellulose fiber and the parent material (transparent adhesive or transparent resin).

As the cellulose nano-fiber, various ones known in public can be used. For example, vegetable cellulose and bacteria cellulose are mentioned, and in particular, vegetable cellulose obtained from wood flour is suitable. Moreover, these may be used in combination in order to increase strength and an elastic modulus.

The polarization solving adhesive can be produced by molding one, in which the polarization solving fiber is uniformly dispersed into the transparent adhesive as a base material, into a plate shape or a film shape. A method of the production is not particularly limited. However, examples of methods of the production include the methods, which are application, dip coating, spraying, transfer coating, and the like of the adhesive onto nonwoven fabric made of the polarization solving fiber.

A blend ratio of the polarization solving fiber just needs to be 1 to 95 weight % with respect to a total amount of the adhesive layer 36 Preferably, the blend ratio is 30 to 90 weight %.

A production method of the adhesive layer 36 includes a physical surface smoothing treatment step.

As shown in FIG. 1B, as another example, the adhesive layer 39 is made of an acrylic adhesive that does not contain the polarization solving fiber.

As an example, the base material layer 40 is made of a polarization solving base material containing the polarization solving fiber. The parent material that composes the polarization solving base material is transparent resin such as polycarbonate resin, methacrylic resin, PET resin, polystyrene resin, polyolefin resin including a cyclic structure, and glass. In such a way, a base material composition excellent in transparency and durability can be obtained.

Polarization solving fiber, which is included in the base material 40, and a production method thereof are the same as those of the polarization solving fiber, which is included in the adhesive layer 36, and the production method thereof, and a description thereof is omitted.

The polarization solving base material can be produced by molding one, in which the polarization solving fiber is dispersed into the transparent resin, into a plate shape or a film shape. A method of the production is not particularly limited: however, for example, there can be used a method, in which the polarization solving fiber is added to molten or fused transparent resin, and thereafter, the polarization solving base material is molded by using an extrusion molding method, a solution casting method, a calendar method, and the like. Desirably, a blend ratio of the polarization solving fiber in the polarization solving base material is 1 weight % or more to 95 weight % or less, and more preferably, 30 weight % or more to 90 weight % or less.

A production method of the polarization solving base material includes a physical surface smoothing treatment step.

As shown in FIG. 1A, as another example, the base material layer 37 is made of a front surface base material that does not contain the polarization solving fiber.

As combination examples of the adhesive layers 36 and 39 and the base material layers 37 and 40, there are mentioned: a combination of the polarization solving adhesive (36) and the front surface base material (37), which is shown in FIG. 1A; a combination of the acrylic adhesive (39) and the polarization solving base material (40), which is shown in FIG. 1B; and a combination of the polarization solving adhesive (36) and the polarization solving base material (40), which is shown in FIG. 1B. That is to say, in the embodiment, the polarization solving fiber just needs to be contained in at least one of the adhesive layers 36 and 39 and the base material layers 37 and 40. In such a way, the polarization solving fiber solves the linear polarization of the displayed images outputted from the liquid crystal panels 31 and the touch panels 34, and can thereby enhance the visibility of the displayed images.

Moreover, the adhesive layers 36 and 39 and the base material layers 37 and 40 are located more on the output side of the displayed images than the polarization plate 16 which the liquid crystal panel 31 includes. In such a way, the polarization can be suppressed from being generated again on the displayed images which have transmitted through the adhesive layers 36 and 39 and the base material layers 37 and 40.

In a case where at least one of the adhesive layers 36 and 39 and the base material layers 37 and 40 contains the polarization solving fiber, a concentration of the polarization solving fiber may be set at 5 capacity % or more to 40 capacity % or less. If such a fiber concentration stays within this range, then the polarization solving properties and the transparency can be made compatible with each other.

A thickness of a member that contains the polarization solving fiber may be set at 10 μm or more to 50 μm or less. If the thickness of the member stays within this range, then the haze can be suppressed to be low, and a loss of transmittance can be reduced. Further, if the thickness of the member stays within above range, unevenness of the thickness can be reduced, and such a displayed image can be sharpened. Here, in a case where only either of the adhesive layers 36 and 39 and the base material layers 37 and 40 contain the polarization solving fiber, then the member that contains the polarization solving fiber is either one of the adhesive layer 36 and the base material layer 40. Moreover, in a case where both of the adhesive layer 36 and the base material layer 40 contain the polarization solving fiber, then the member that contains the polarization solving fiber is the adhesive layer 36 and the base material layer 40.

As shown in FIG. 1A and FIG. 2A, the display apparatus according to the embodiment further includes an anti-reflection film (AR film) 38 or an anti-glare film (AG film) 46, which is stacked on the base material layer 37 or 40. The AR film 38 has a multi-layer structure in which a thickness and a refractive index are controlled, and then cancels pieces of reflected light on an outermost front layer of the multi-layer structure and interfaces of the respective layers thereof one another, and thereby reduces the reflection on the front surface. Moreover, as the AR film 38, a moss-eye film is also applicable as well as such a multi-layer structure type.

Moreover, as shown in FIG. 1G and FIG. 2D, two phase difference films 42 and 43 may be inserted so as to sandwich the front and back surfaces of the touch panel 34 or 45. In this case, the phase difference film 42 is directly pasted onto the back surface of the touch panel 34, and the phase difference film 43 is directly pasted onto the front surface of the touch panel 34, and the linear polarization layer 35 is stacked on the phase difference film 43. The phase difference films 42 and 43 are mainly manufactured in such a manner that dicotic liquid crystal is fixed to a TAC film in a specific orientation, followed by coating. As the phase difference films 42 and 43, for example, ¼ phase difference films provided with a function to shift a phase of transmitting light by ¼ may be used. The ¼ phase difference films are pasted onto the linear polarization layer 35, whereby circular polarization films are formed. Hence, in this case, displayed images formed by the pieces of light, which have transmitted through the linear polarization layer 35 and the phase difference film 43, are circularly polarized.

In an event of manufacturing the display apparatus according to the embodiment, first, layers on the gas layer AL or the bonding agent 41, the layers excluding the liquid crystal panel 31, the AR film 32 and the AG film 44, are stacked on one another. As a stacking method, for example, there are mentioned: a pasting method, a layer forming method and the like, which include mutual film pasting by a roller, insert molding, vacuum molding, injection press molding, spray coating, evaporation, sputtering, dipping, and gravure coating. In such a manner as described above, the respective optical films described above are pasted onto the touch panel 34, whereby stacked bodies LB1 and LB2 shown in FIG. 1A and FIG. 1D are fabricated. Thereafter, onto the liquid crystal panel 31, the stacked bodies LB1 and LB2 are placed or bonded while interposing the gas layer AL therebetween by using the bonding agent 41, and are thereby brought into intimate contact therewith. In such a way, the display apparatus according to the embodiment can be manufactured. In accordance with this manufacturing method, the number of parts count is reduced since the structure is simple, and moreover, a film forming process is also simplified in the event of the manufacture, and accordingly, the display device can be manufactured at low cost.

Figure 4:
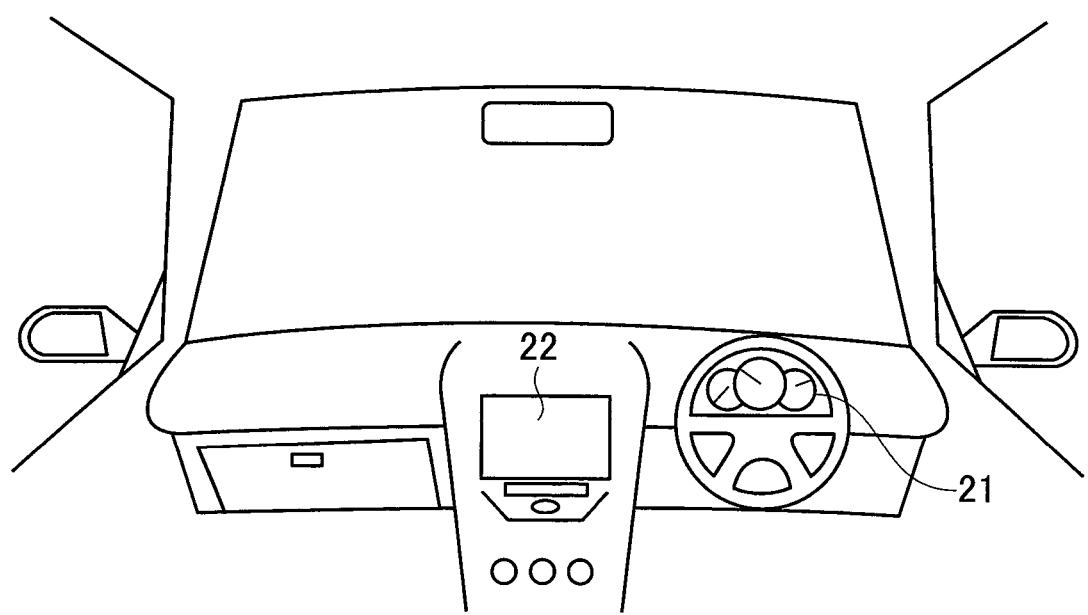
FIG. 4 is a schematic view in a case of applying a display apparatus according to an embodiment of the present invention as an automotive display apparatus.

As shown in FIG. 4, the display apparatus according to the embodiment of the present invention is applicable as an automotive display apparatus such as a display apparatus 22 which a navigation or audio/visual system mounted on a vehicle includes, and as an in-meter display apparatus 21 mounted on a dashboard in front of a driver's seat of the vehicle.

It is highly frequent that a driver of the vehicle wears sunglasses. In a case where drive information is presented by the displayed image, which is linearly polarized, to the driver who wears sunglasses having a polarization function, if the polarization of the sunglasses and the polarization of the displayed image forms the relationship of the crossed Nicols, then a quantity of the transmission light is lowered to a large extent, and the visibility is significantly lowered. As opposed to this, if the drive information is presented by the displayed image, in which the linear polarization is solved, by using the display apparatus according to the embodiment, then the lowering of the quantity of transmission light and of the visibility can be suppressed even if the driver wears the sunglasses having the polarization function.

(Evaluation Method of Visibility)

A light environment laboratory, in which a light source with illuminance of more than 5000 1× is placed, is used as a test place, and an evaluator who wears the sunglasses having the polarization function sits down on a driver's seat of an actual vehicle. On a display screen attached onto a center console in the actual vehicle, a menu screen of a car navigation system is displayed. The display screen was attached at a position, which is downward by 30° from an eyes' position of the evaluator, at a plane angle of 35° with respect to a vehicle traveling direction, and at a sight distance of approximately 700 mm. Brightness and contrast of the display screen are set at defaults. In the light environment laboratory, a light source is placed in a direction, which is upward by 20° from the evaluator and left rearward by 60° in the vehicle. Note that it is assumed that the polarization direction of the displayed image outputted from the display apparatus and the polarization direction of the sunglasses are in a state of the crossed Nicols.

Under the above-described conditions, visibilities of display apparatuses according to Examples 1 to 15 and Comparative examples 1 to 3 were evaluated by four evaluators based on the following evaluation criteria.

5: Signs up to details (small letters on a map) can be determined.
4: Among signs, large letters (menu) can be clearly recognized.
3: Among signs, large letters (menu) can be barely recognized.
2: Among signs, large diagrams (road and the like on a map) can be barely recognized.
1: Signs can never be determined.

(Polarization Solving Fiber (Pretreatment))

As a raw material, one is used, which is obtained by performing dispersion treatment for a 1-wt % aqueous solution of CEOLUS RC-591 made by Asahi Kasei Chemicals Corporation, which is a colloidal grade of crystallite cellulose, by using a high-pressure homogenizer for 10 minutes. To 500 ml of this solution, there were added: 25 mL of acetic anhydride; 400 mL of acetic acid; 500 mL of toluene; and 2.5 mL of perchloric acid, and a reaction was caused for a resultant mixture at room temperature for 1 hour, whereby a front surface of the cellulose was converted into acetyl. Water-containing fiber thus obtained was adjusted into a suspension in which a fiber content was 0.1 weight %, water thereof was removed by filtration, and the fiber was formed into a sheet shape. Moreover, the sheet-shaped fiber was hot-pressed at 55° for 72 hours with a pressure of 15 kPa, and water was removed therefrom, whereby dry fiber sheet with a thickness of 50 μm was formed.

(Preparation of Polarization Solving Adhesive)

The dry fiber sheet obtained by the above-described method was soaked into a UV curing adhesive FINETAC CT6010 (made by DIC Corporation) under a reduced pressure, and was left standing still for 12 hours. Thereafter, by using a belt conveyer type UV irradiation apparatus (Fusin F300 and LC6B Bench Top Conveyor made by Fusion Systems Co., Ltd.), the fiber sheet impregnated with the resin was irradiated with ultraviolet rays, and was cured. A total irradiation energy amount at this time was 5 J/cm². In such a way, the polarization solving adhesive was prepared.

(Preparation of Polarization Solving Base Material)

The dry fiber sheet obtained by the above-described method was soaked into photoinitiator-containing acrylic resin (TCDDMA) under a reduced pressure, and was left standing still for 12 hours. Thereafter, by using a belt conveyer type UV irradiation apparatus (Fusin F300 and LC6B Bench Top Conveyor made by Fusion Systems Co., Ltd.), the fiber sheet impregnated with the resin was irradiated with ultraviolet rays, and was cured. A total irradiation energy amount at this time was 20 J/cm². Thereafter, the fiber sheet was annealed (subjected to heat treatment) at 160° C. for two hours in a vacuum, and the polarization solving base material was prepared.

Example 1

FIG. 1A shows a cross-sectional configuration of the display apparatus according to Example 1. The liquid crystal panel 31 has a configuration shown in FIG. 3, and above the output side of the liquid crystal panel 31, the touch panel 34 of the electrostatic capacitance type is arranged while interposing the gas layer AL therebetween. Onto the interface between the liquid crystal panel 31 and the gas layer AL, and onto the interface between the touch panel 34 and the gas layer AL, the AR films 32 and 33 are pasted, respectively. In such a way, the reflection of light on the interface between the liquid crystal panel 31 and the gas layer AL and on the interface between the touch panel 34 and the gas layer AL is suppressed.

On the touch panel 34, the linear polarization layer 35 is stacked. Above the linear polarization layer 35, the base material layer 37 is stacked while interposing the adhesive layer 36 therebetween. In Example 1, the adhesive layer 36 is composed of the polarization solving adhesive containing the polarization solving fiber, and the base material layer 37 is made of the front surface base material that does not contain the polarization solving fiber. The AR film 38 is stacked on the base material layer 37.

In Example 1, the linear polarization film for use in the linear polarization layer 35 is one imparted with absorption dichroism in such a manner that, after a base material film made of PVA (polyvinyl alcohol) is dyed with iodine or organic dye, the base material film is uniaxially stretched to approximately two to three times to thereby array molecules of the dye regularly. This linear polarization film exerts a function to reduce the light transmittance without changing a color tone thereof. In Example 1, as the linear polarization layer 35, AG150 made by Nitto Denko Corporation is used. Moreover, in Example 1, as the AR films 32, 33 and 38, three-layer AR films of MFAR-Roll made by MeCan Imaging Inc. are used.

Example 2

FIG. 1B shows a cross-sectional configuration of the display apparatus according to Example 2. In Example 2, the adhesive layer 39 is composed of the acrylic adhesive that does not contain the polarization solving fiber, and the base material layer 40 is made of the polarization solving base material that contains the polarization solving fiber. Other points are the same as those of FIG. 1A, and a description thereof is omitted.

Example 3

FIG. 1C shows a cross-sectional configuration of the display apparatus according to Example 3. In Example 3, the adhesive layer 36 is composed of the polarization solving adhesive containing the polarization solving fiber, and the base material layer 40 is composed of the polarization solving base material containing the polarization solving fiber. That is to say, both of the base material layer 40 and the adhesive layer 36 contain the polarization solving fiber. Other points are the same as those of FIG. 1A, and a description thereof is omitted.

Example 4

FIG. 1D shows a cross-sectional configuration of the display apparatus according to Example 4. In Example 4, on the output side of the liquid crystal panel 31, the touch panel 34 of the electrostatic capacitance type is directly stacked while interposing the bonding agent 41 therebetween, and the gas layer AL is not interposed therebetween. Hence, the AR films 32 and 33 for preventing the reflection are not interposed, either. In Example 4, as the bonding agent 41, a UV-curing acrylic bonding material (KCPF3001 made by Foresight) is used. Moreover, above the touch panel 34, the base material layer 37 that does not contain the polarization solving fiber is stacked while interposing therebetween the adhesive layer 36 that contains the polarization solving fiber. The linear polarization layer 35 is not interposed between the touch panel 34 and the adhesive layer 36. Other points are the same as those of FIG. 1A, and a description thereof is omitted.

Example 5

FIG. 1E shows a cross-sectional configuration of the display apparatus according to Example 5. In Example 5, the adhesive layer 39 is composed of the acrylic adhesive that does not contain the polarization solving fiber, and the base material layer 40 is composed of the polarization solving base material that contains the polarization solving fiber. Other points are the same as those of FIG. 1D, and a description thereof is omitted.

Example 6

FIG. 1F shows a cross-sectional configuration of the display apparatus according to Example 6. In Example 6, the adhesive layer 36 is composed of the polarization solving adhesive containing the polarization solving fiber, and the base material layer 40 is composed of the polarization solving base material containing the polarization solving fiber. That is to say, both of the base material layer 40 and the adhesive layer 36 contain the polarization solving fiber. Other points are the same as those of FIG. 1D, and a description thereof is omitted.

Example 7

FIG. 1G shows a cross-sectional configuration of the display apparatus according to Example 7. The display apparatus according to Example 7 further includes the two phase difference films 42 and 43 inserted so as to sandwich the front and back surfaces of the touch panel 34 of the electrostatic capacitance type. Other points are the same as those of FIG. 1A, and a description thereof is omitted.

Example 8

FIG. 1H shows a cross-sectional configuration of the display apparatus according to Example 8. In Example 8, the adhesive layer 39 is composed of the acrylic adhesive that does not contain the polarization solving fiber, and the base material layer 40 is made of the polarization solving base material that contains the polarization solving fiber. Other points are the same as those of FIG. 1G, and a description thereof is omitted.

Example 9

FIG. 1I shows a cross-sectional configuration of the display apparatus according to Example 9. In Example 9, the adhesive layer 36 is composed of the polarization solving adhesive containing the polarization solving fiber, and the base material layer 40 is made of the polarization solving base material containing the polarization solving fiber. That is to say, both of the base material layer 40 and the adhesive layer 36 contain the polarization solving fiber. Other points are the same as those of FIG. 1G, and a description thereof is omitted.

Example 10

FIG. 2A shows a cross-sectional configuration of the display apparatus according to Example 10. On the output side of the liquid crystal panel 31, the touch panel 45 of the resistance film type is placed while interposing the gas layer AL therebetween. Onto the interface between the liquid crystal panel 31 and the gas layer AL, the AG film 44 is pasted.

On the touch panel 45, the linear polarization layer 35 is stacked. Above the linear polarization layer 35, the base material layer 37 is stacked while interposing the adhesive layer 36 therebetween. In Example 10, the adhesive layer 36 is composed of the polarization solving adhesive that contains the polarization solving fiber, and the base material layer 37 is made of the front surface base material that does not contain the polarization solving fiber. The AG film 46 is stacked on the base material layer 37.

Example 11

FIG. 2B shows a cross-sectional configuration of the display apparatus according to Example 11. In Example 11, the adhesive layer 39 is composed of the acrylic adhesive that does not contain the polarization solving fiber, and the base material layer 40 is made of the polarization solving base material that contains the polarization solving fiber. Other points are the same as those of FIG. 2A, and a description thereof is omitted.

Example 12

FIG. 2C shows a cross-sectional configuration of the display apparatus according to Example 12. In Example 12. the adhesive layer 36 is composed of the polarization solving adhesive containing the polarization solving fiber, and the base material layer 40 is made of the polarization solving base material containing the polarization solving fiber. That is to say, both of the base material layer 40 and the adhesive layer 36 contain the polarization solving fiber. Other points are the same as those of FIG. 2A, and a description thereof is omitted.

Example 13

FIG. 2D shows a cross-sectional configuration of the display apparatus according to Example 13. In comparison with FIG. 1A, the display apparatus according to Example 13 is different therefrom in further including the two phase difference films 42 and 43 inserted so as to sandwich the front and back surfaces of the touch panel 45; however, is common thereto in other points. Moreover, in comparison with FIG. 1G, the display apparatus according to Example 13 is different therefrom in using the touch panel 45 of the resistance film type in place of the touch panel 34 of the electrostatic capacitance type; however, is common thereto in other points.

Example 14

FIG. 2E shows a cross-sectional configuration of the display apparatus according to Example 14. In Example 14, the adhesive layer 39 is composed of the acrylic adhesive that does not contain the polarization solving fiber, and the base material layer 40 is made of the polarization solving base material that contains the polarization solving fiber. Other points are the same as those of FIG. 2D, and a description thereof is omitted.

Example 15

FIG. 2F shows a cross-sectional configuration of the display apparatus according to Example 15. In Example 15, the adhesive layer 36 is composed of the polarization solving adhesive containing the polarization solving fiber, and the base material layer 40 is composed of the polarization solving base material containing the polarization solving fiber. That is to say, both of the base material layer 40 and the adhesive layer 36 contain the polarization solving fiber. Other points are the same as those of FIG. 2D, and a description thereof is omitted.

Comparative Example 1

Figure 5:
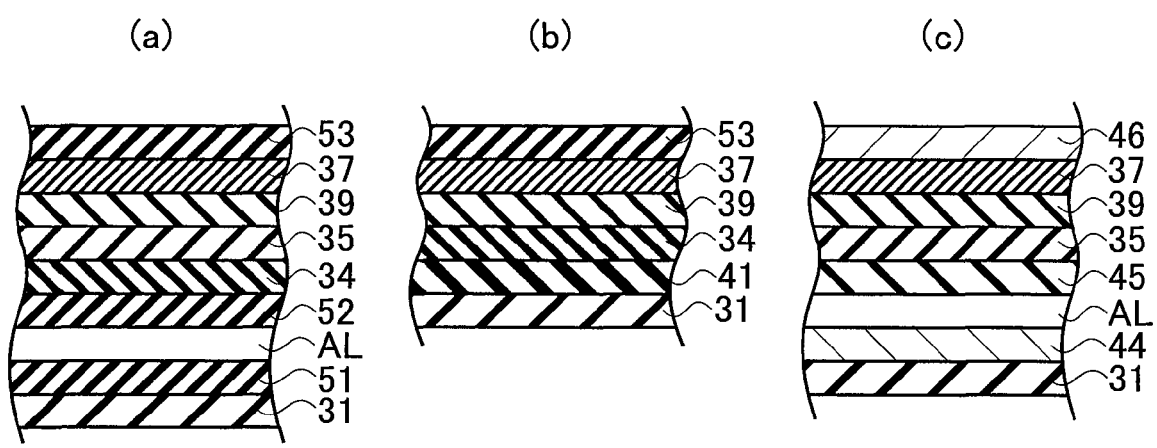
FIG. 5A to FIG. 5C are cross-sectional views showing stack structures of display apparatuses according to Comparative example 1 to Comparative example 3.

FIG. 5A shows a cross-sectional configuration of the display apparatus according to Comparative example 1. In Comparative example 1, the adhesive layer 39 is composed of the acrylic adhesive that does not contain the polarization solving fiber, and the base material layer 37 is made of the front surface base material that does not contain the polarization solving fiber. That is to say, the polarization solving fiber is not contained in either of the base material layer 40 and the adhesive layer 36. Moreover, in comparison with the display apparatus of FIG. 1A, the display apparatus according to Comparative example 1 is different in using moss-eye films 51, 52 and 53 in place of the AR films 32, 33 and 38 having the multi-layer structure. Other points are the same as those of FIG. 1A, and a description thereof is omitted.

Comparative Example 2

FIG. 5B shows a cross-sectional configuration of the display apparatus according to Comparative example 2. Also in Comparative example 2, the polarization solving fiber is not contained in either of the base material layer 40 and the adhesive layer 36 in a similar way to Comparative example 1. Moreover, in comparison with the display apparatus of FIG. 1D, the display apparatus according to Comparative example 1 is different therefrom in using the moss-eye film 53 in place of the AR film 38 having the multi-layer structure. Other points are the same as those of FIG. 1D, and a description thereof is omitted.

Comparative Example 3

FIG. 5C shows a cross-sectional configuration of the display apparatus according to Comparative example 3. Also in Comparative example 3, the polarization solving fiber is not contained in either of the base material layer 40 and the adhesive layer 36 in a similar way to Comparative example 1. Other configurations are the same as those of FIG. 2A, and a description thereof is omitted.

(Evaluation Test Results of Examples and Comparative Examples)

Table 1 shows the configurations and evaluation test results of the display apparatuses according to Examples 1 to 15 and Comparative examples 1 to 3, which are described above. A polarization solution degree in Table 1 represents a solution degree of the linear polarization of the displayed image outputted from the display apparatus. As shown in Table 1, it is understood that evaluations of the contrast, polarization solution degree and visibility of the displayed image are increased in the display apparatuses according to Examples 1 to 15, in each of which at least one of the adhesive layer and the base material layer contains the polarization solving fiber, in comparison with the display apparatuses according to Comparative examples 1 to 3, in each of which either of the adhesive layer and the base material layer does not contain the polarization solving fiber.

TABLE 1

| Category | | AR, AG | Base material | Adhesive | Configuration (in order of front layer from left) | | | | | | | Evaluation test result (at time of crossed Nicols) | | | Visibility |
|---|---|---|---|---|---|---|---|---|---|---|---|---|---|---|---|
| | | | | | Linear polarization | Phase difference | Touch panel | Phase difference | AR | Bonding | AR | LCD | Contrast | Polarization solution degree (%) | Haze (%) | (5-step evaluation) |
| Example | 1 | AR | Acrylic | Polarization solving adhesive | Present | None | Electrostatic capacitance type | None | AR | None | AR | Present | 2.4 | 27 | 33 | 4 |
| | 2 | AR | Polarization solving base material | Acrylic adhesive | Present | None | | None | AR | None | AR | Present | 2.5 | 29 | 42 | 4 |
| | 3 | AR | Polarization solving base material | Polarization solving adhesive | Present | None | | None | AR | None | AR | Present | 3 | 33 | 41 | 4 |
| | 4 | AR | Acrylic | Polarization solving adhesive | None | None | | None | None | Present | None | Present | 2.3 | 28 | — | 4 |
| | 5 | AR | Polarization solving base material | Acrylic adhesive | None | None | | None | None | Present | None | Present | 2.7 | 31 | — | 4 |
| | 6 | AR | Polarization solving base material | Polarization solving adhesive | None | None | | None | None | Present | None | Present | 3.2 | 34 | — | 4 |
| | 7 | AR | Acrylic | Polarization solving adhesive | Present | Present | | Present | AR | None | AR | Present | 3.5 | 44 | 34 | 5 |
| | 8 | AR | Polarization solving base material | Acrylic adhesive | Present | Present | | Present | AR | None | AR | Present | 3.5 | 42 | 36 | 5 |
| | 9 | AR | Polarization solving base material | Polarization solving adhesive | Present | Present | | Present | AR | None | AR | Present | 4 | 48 | 39 | 5 |
| | 10 | AG | Acrylic | Polarization solving adhesive | Present | None | Resistance film type | None | None | None | None | Present | 1.28 | 27 | 69 | 3 |
| | 11 | AG | Polarization solving base material | Acrylic adhesive | Present | None | | None | None | None | None | Present | 1.32 | 31 | 68 | 2 |
| | 12 | AG | Polarization solving base material | Polarization solving adhesive | Present | None | | None | None | None | None | Present | 1.38 | 33 | 80 | 2 |
| | 13 | AR | Acrylic | Polarization solving adhesive | Present | Present | | Present | AR | None | AR | Present | 1.39 | 30 | 66 | 3 |
| | 14 | AR | Polarization solving base material | Acrylic adhesive | Present | Present | | Present | AR | None | AR | Present | 1.43 | 40 | 68 | 3 |
| | 15 | AR | Polarization solving base material | Polarization solving adhesive | Present | Present | | Present | AR | None | AR | Present | 1.5 | 38 | 71 | 2 |

TABLE 1-continued

| Category | | AR, AG | Base material | Adhesive | Configuration (in order of front layer from left) | | | | | | | Evaluation test result (at time of crossed Nicols) | | | Visibility (5-step evaluation) |
|---|---|---|---|---|---|---|---|---|---|---|---|---|---|---|---|
| | | | | | Linear polarization | Phase difference | Touch panel | Phase difference | AR | Bonding | AR | LCD | Contrast | Polarization solution degree (%) | Haze (%) | |
| Comparative example | 1 | AR | Acrylic | Acrylic adhesive | Present | None | Electrostatic capacitance type | None | AR | None | AR | Present | 0.02 | 0 | 4 | 1 |
| | 2 | AR | Acrylic | Acrylic adhesive | None | None | | None | None | Present | None | Present | 0.02 | 0 | — | 1 |
| | 3 | AG | Acrylic | Acrylic adhesive | Present | None | Resistance film type | None | None | None | None | Present | 0.01 | 0 | 55 | 1 |

As described above, in accordance with the embodiment of the present invention, the following functions and effects are obtained.

In accordance with the embodiment, at least one of the base material layers 36 and 39 and the adhesive layers 37 and 40 contains the polarization solving fiber, whereby the polarization solving fiber solves the linear polarization of the displayed image, and can thereby enhance the visibility of the displayed image.

The polarization solving fiber is contained in at least one of the base material layers 36 and 39 and the adhesive layers 37 and 40, and accordingly, it becomes unnecessary to stack a new layer for solving the polarization, and manufacturing cost can be suppressed to be low. At the same time, it becomes possible to thin the whole of the layers, and the light transmittance can be enhanced by reducing the haze. Hence, image quality of the displayed image is improved.

The polarization solving fiber is contained in at least one of the base material layers 36 and 39 and the adhesive layers 37 and 40, and accordingly, irregularities of the fiber do not appear on the outermost front surface of the display apparatus. Therefore, a white blur can be suppressed by reducing the haze. Hence, the image quality of the displayed image is improved.

The polarization solving fiber is an aggregate of the cellulose nano-fiber, the cellulose nano-fiber contains a hydroxyl group, a part of the hydroxyl group is chemically modified, a width of the fiber is 10 nm or more to 50 nm or less, and an aspect ratio of the fiber is 1 or more to 200 or less. By satisfying these conditions, such a solution rate of the linear polarization and the visibility of the displayed image are further enhanced.

The base material layers 36 and 39 and the adhesive layers 37 and 40 are located more on the output side of the displayed image than the linear polarization plate which the liquid crystal panel 31 includes. In such a way, the linear polarization can be suppressed from being generated again on the light which has transmitted through the base material layers 36 and 39 and the adhesive layers 37 and 40.

The blend ratio of the polarization solving fiber is 1 weight % or more to 95 weight % or less with respect to the base material having the polarization solving properties, whereby a range of loading, which is optimum for striking a balance between the polarization solving properties and the transparency, can be set.

The thickness of the member that contains the polarization solving fiber is 10 μm or more to 50 μm or less, whereby the transmittance can be enhanced by reducing the haze. Moreover, at the same time, the unevenness of thickness is reduced, and the displayed image can be sharpened.

The linear polarization layer 35 and the phase difference film 43 are interposed between the touch panels 34 and 45 and the adhesive layers 37 and 40, whereby the displayed image is circularly polarized, and accordingly, the polarization solution degree and the contrast of the displayed image are enhanced, and at the same time, the linear polarization layer 35 can effectively cut off the component of the light incident from the outside.

In the case where the gas layer AL is interposed between the liquid crystal panel 31 and the touch panels 34 and 45, the light reflected on the interfaces with the gas layer AL is increased, and accordingly, it is necessary to enhance the degree of the linear polarization in the linear polarization layer 35. Hence, in this case, the polarization solving fiber is contained in at least one of the base material layers 36 and 39 and the adhesive layers 37 and 40, whereby the linear polarization by the linear polarization layer 35 can be solved effectively.

In the case where the touch panel 45 is the touch panel of the resistance film type, the light reflected in the air layer contained in the inside of the touch panel 45 is increased, and accordingly, it is necessary to enhance the degree of the linear polarization in the linear polarization layer 35. Hence, also in this case, the polarization solving fiber is contained in at least one of the base material layers 36 and 39 and the adhesive layers 37 and 40, whereby the linear polarization by the linear polarization layer 35 can be solved effectively.

In the case where the display apparatus according to the embodiment is applied to the automotive display apparatus, the drive information is presented by the displayed image in which the linear polarization is solved, and even if the driver wears the sunglasses having the polarization function, the lowering of the transmission light quantity and visibility can be suppressed.

In the event of manufacturing the display apparatus according to the embodiment, first, the base material layers 37 and 40 are pasted onto the touch panels 34 and 45 while interposing the adhesive layers 36 and 39 therebetween, whereby each of the stacked bodies LB1 and LB2 is formed. Thereafter, each of the stacked bodies LB1 and LB2 is placed onto the display screen of the liquid crystal panel 31. In accordance with this manufacturing method, the number of parts count is reduced since the structure is simple, and moreover, the film forming process is also simplified in the event of the manufacture, and accordingly, the display device can be manufactured at low cost.

The description has been made as above of the embodiment and Examples 1 to 15; however, it should not be understood that the description and the drawings, which form a part of this disclosure, limit this invention. From this disclosure, varieties of alternative embodiments, examples and operation technologies will be obvious for those skilled in the art.

This application claims the priority of Japanese Patent Application No. 2012-029267 filed on Feb. 14, 2012, and the entire contents of this application is incorporated herein by reference.

In accordance with the display apparatus, the automotive display apparatus and the method for manufacturing the display apparatus according to the present invention, the polarization solving properties of the displayed image are enhanced, whereby the visibility of the displayed image can be enhanced.

REFERENCE SIGNS LIST

16 LINEAR POLARIZATION PLATE
31 LIQUID CRYSTAL PANEL
34, 45 TOUCH PANEL
36, 39 ADHESIVE LAYER
37, 40 BASE MATERIAL LAYER
35 LINEAR POLARIZATION LAYER
AL GAS LAYER
LB1, LB2 STACKED BODY

The invention claimed is:
1. A display apparatus comprising:
a liquid crystal panel;
a base material layer arranged on the liquid crystal panel;
an adhesive layer interposed between the liquid crystal panel and the base material layer,
a touch panel interposed between the liquid crystal panel and the base material layer; and a linear polarization layer arranged on the touch panel between the touch panel and the base material layer, wherein the linear polarization layer is arranged in an orientation of transmitting polarized light from a side of the liquid crystal panel, both the base material layer and the adhesive layer contain fiber having properties of depolarization, the fiber having the properties of depolarization is an aggregate of cellulose nano-fiber, the cellulose nano-fiber contains a hydroxyl group, a part of the hydroxyl group is chemically modified, a width of the fiber is 10 nm or more to 50 nm or less, and an aspect ratio of the fiber is 1 or more to 200 or less.

2. The display apparatus according to claim 1, wherein the adhesive layer and the base material layer are located on an output side of the liquid crystal panel.

3. The display apparatus according to claim 1, wherein a blend ratio of the fiber having the properties of depolarization is 1 weight % or more to 95 weight % or less with respect to a base material having depolarization properties.

4. The display apparatus according to claim 1, wherein a thickness of a member containing the fiber having the properties of depolarization is 10 μm or more to 50 μm or less.

5. The display apparatus according to claim 1, further comprising: a phase difference film interposed between the touch panel and the linear polarization layer.

6. The display apparatus according to claim 1, wherein a gas layer is interposed between the liquid crystal panel and the touch panel.

7. The display apparatus according to claim 1, wherein the touch panel is a touch panel of a resistance film type.

8. An automotive display apparatus, wherein the display apparatus according to claim 1 is used.

9. A method for manufacturing the display apparatus according to claim 1, the method comprising:

forming one stacked body by pasting the base material layer onto the touch panel while interposing the adhesive layer therebetween; and placing the stacked body on a display screen of the liquid crystal panel.

10. The display apparatus according to claim 1, wherein the liquid crystal panel comprises, in a stacking order from bottom to top, a first linear polarization plate, a back surface electrode, a liquid crystal layer, a front surface electrode, and a second linear polarization plate.

11. The display apparatus according to claim 1, wherein the linear polarization layer is arranged on an output side of the touch panel.

12. The display apparatus according to claim 1, wherein the base material layer is arranged on an output side of the liquid crystal panel.

13. The display apparatus according to claim 1, wherein the touch panel is interposed between the liquid crystal panel and the adhesive layer.

14. The display apparatus according to claim 1, wherein the linear polarization layer is arranged between the adhesive layer and the touch panel.

15. The display apparatus according to claim 1, wherein the base material layer contains acrylic resin, and a concentration of the fiber having properties of depolarization in the base material layer is 5 capacity % or more to 40 capacity % or less, and the adhesive layer contains acrylic resin, and a concentration of the fiber having properties of depolarization in the adhesive layer is 5 capacity % or more to 40 capacity % or less.

* * * * *